United States Patent [19]

Jacobs

[11] Patent Number: 5,369,500
[45] Date of Patent: Nov. 29, 1994

[54] METHOD AND APPARATUS FOR DETERMINING FACSIMILE QUALITY AND SYSTEM USING SAME

[76] Inventor: Henry W. Jacobs, 12507 Cortaro Cove, Austin, Tex. 78729

[21] Appl. No.: 78,522

[22] Filed: Jun. 16, 1993

[51] Int. Cl.$^5$ ............................................ H04M 1/00
[52] U.S. Cl. .................................... 358/406; 379/100; 375/39
[58] Field of Search ...................... 379/93, 100; 375/39, 375/37, 94, 10; 358/402, 406, 407

[56] References Cited

U.S. PATENT DOCUMENTS

| | | | |
|---|---|---|---|
| 4,247,944 | 1/1981 | Sifford | 375/39 |
| 4,827,431 | 5/1989 | Goldshtein | 375/39 |
| 4,937,844 | 6/1990 | Kao | 375/39 |
| 4,941,170 | 7/1990 | Herbst | 358/402 |
| 5,001,724 | 3/1991 | Birgenheier et al. | 375/10 |
| 5,136,634 | 8/1992 | Rae et al. | 379/100 |

OTHER PUBLICATIONS

McConnell, K. R., et al., *FAX: Digital Facsimile Technology & Applications–Section 2.5 Compression Coding Overview*, 1989 Artech House, Inc., Norwood, Mass., pp. 31–38.

Troullinos, G., et al., *Theory, Algorithms and Implementations*, vol. 2, Theory, Algorithms & Implementations, Texas Instruments, Digital Signal Processing Applications with the TMS320 Family, Mar., 1990, pp. 219–278.

*Primary Examiner*—Edward L. Coles, Sr.
*Assistant Examiner*—Jerome Grant, II
*Attorney, Agent, or Firm*—Robert L. Troike; Richard L. Donaldson

[57] ABSTRACT

A system and method of determining the quality of a received facsimile signal is provided herein by measuring the received signal from a digital modem receiver 60. The end of a scan line is detected by looking for the special code of eleven logic 0s followed by a logic 1. The distance value between the position value of the received signal elements and the standard reference position is determined and if this distance exceeds a given threshold that is recorded and the percentage of those that exceed this threshold distance identifies the quality.

13 Claims, 5 Drawing Sheets

METHOD AND APPARATUS FOR DETERMINING FACSIMILE QUALITY AND SYSTEM USING SAME

TECHNICAL FIELD OF THE INVENTION

This invention relates to facsimile machines and more particularly to a method of determining the copy quality of a facsimile machine page without decoding the scan lines.

BACKGROUND OF THE INVENTION

Alexander Bain received a patent on an early facsimile machine a hundred and fifty years ago. The telegraph and facsimile came on the scene about the same time and had many things in common such as contact switching of metal patterns and interrupted current from the battery to convey information and both were received by marking on paper. In 1843, Bain obtained English patent number 9,745 for recording telegraph "facsimile unit" recorded on electrolytic paper. Bain used a pendulum for driving power and also to provide the clocking for timing operations. Casselli, in 1865, is believed to have used the first commercial facsimile which was sent over a long distance telegraph circuit. A satisfactory overall facsimile performance took many years with many people contributing to both the facsimile and other communication arts. Dr. Arthur Korn of Germany combined the tuning fork and synchronous motor and also started the optical scanning and photographic recording which are still used in today's fax systems. With the addition of vacuum tube amplifiers on telephone lines, telephone lines then became used for sending facsimile. AT&T provided a telephotography service which transmitted newspaper pictures by facsimile transmission. This has formed the basis for AT&T's telephoto equipment which was used by Associated Press, United Press International and Reuters. The Times Wide World Photo Service contacted Austin Cooly who worked on a facsimile for years to develop for them a semi-portable facsimile system. The resulting Cooly system demonstrated that good quality pictures could be sent even over regular unconditioned long distance telephone lines. A photographer taking a picture at one location could made a print of the picture for a facsimile operator. He then mounted it on a cylinder of a portable facsimile transmitter about the size of a small suitcase, a radical reduction of the size from a room of equipment used by Associated Press. A regular telephone call was placed to the Times picture darkroom from any telephone including the coin operated phone. A standard automobile battery served as a power source for the transmitter. The Times Facsimile Corporation (TFC) then began manufacturing and selling facsimile units to others. The military used it for weather map fax transmissions. The U.S. Army Air forces used the facsimile for weather map transmission during World War II and set up a world wide standard for weather facsimile. The International Telegraph and Telephone Consultive Committee (CCITT) initially adopted somewhat different standards, but abandoned them for use of those set at TFC. After the war, networks were set up for the broadcasting of facsimile weather charts over the telephone lines and over HF (High Frequency) radio. In the years that followed the war, various new facsimile equipment were specialized applications were designed and manufactured. The Electronics Industry Association (EIA) established a technical committee TR-29 on facsimile systems and equipment in the early 1960's. However, it was not until October 1966, before an EIA standard RS328 message facsimile equipment for operations switch voice facility using data communication equipment was published. This was the first U.S. "standard" on office fax. In 1967, with the AT&T Carterphone decision, permission was granted to allow direct connection to the PSTN (Public Switch Telephone Network) or the regular Bell telephone lines. The first group standard was Group 1 facsimile. This was generally better than earlier fax copies, facsimile units were still unreliable taking six minutes per page and were analog units. Users that accepted the quality of the Group 1 needed a faster system and the faster system became the Group 2 facsimile. This standard referred to as the three minute facsimile units already became the world wide acceptable system. Quality facsimile started with a digital facsimile. The earliest digital facsimile units used the adaptive run-length coding algorithm. Run-length coding removes redundancy from the page being sent and thus shortens the transmission time. In this system, a digital code word represents the number of successive white picture elements along a scanned line before the next black picture element (pixel or pel). The next code word represents the number of black pixels (picture elements) following a run of white picture elements. In 1980, the CCITT adopted a standard for digital facsimile which is referred to as Group 3. Although V.29 modem was intended to be used on 4 wire digital, facsimile units were used successfully using the V.29 modem with half-duplex on the PSTN and became an option in the Group 3 standard.

The standards for the Group 3 are Recommendations T.4 and T.30 in the CCITT Blue Book, including revisions completed in November 1988 and later. The main revisions of T.4 and T.30 are the addition of an optional error-free method of transmission and for two smaller-page versions of Group 3 fax.

Referring to FIG. 1, marked prior art, there is illustrated a conventional Group 3 facsimile unit. A scanner, such as a CCD (Charge Couple Device) scanner, reads the page being sent. The output is a series of picture elements (pels or pixels), and the amplitude of each pulse represents the brightness of the image on each element of the CCD chip or scanner. The scanner reads a very narrow line which may be in the order of 0.01 or 0.005 inch high, across the width of the page being sent. Scanning across the with of the page results in 1,728 pixels which results in a generation of 1,728 bits per line. A two-line memory stores the adjacent lines. The output from the scanner is in the analog signal and is converted by an A/D converter which produces one bit per picture element. The output from the A/D converter is digital and is passed through a Modified Huffman (MH) or Modified Read (MR) compression device that acts to compress the picture elements information to a small fraction of the number of bits. The Modified Huffman is a run-length coding and the modified read is a two-dimensional coding which further compresses the pixel or pel information. This coding is well known and is standard and is specified in CCITT Recommendation T.4 for Group 3. In a scanning line each sensor element has one bit of information to represent a black or white pixel or pel. Instead of sending a white line across a page as 1728 bits, the MH sends a 9-bit code word representing this. Since 1728, code words would have to be used to cover all run lengths the runs are grouped in multiples of 64 pels or pixels in a make-up code table. More detailed description of the code tables, etc., may be found various texts and in a book entitled "FAX: Digital Facsimile Technology & Applications" by Kenneth R. McConnell et al., published by Artech House, Inc., 685 Canton St., Norwood, Mass. 02062 and, in particular, this is shown in Section 2.5. This text is incorporated herein by reference. These codes are well known to those of ordinary skill in the art. The modified read is a relative addressing code uses vertical correlation with two adjacent lines on a page. For example, a black pel run on one line and a black pel line on the adjacent line uses one bit to provide that condition. The compressed digital output from the MH/MR compression, is stored in a buffer memory for use by the modem. The modem converts these signals into analog signals that can be sent over the regular telephone lines or PSTN. The modem is a modulation-demodulation device that accepts digital information and modulates it into the analog signal that is received by the telephone line. Of course, at the receiver, the analog signal is converted back to a run length coded binary data sent at the transmitter which is then expanded using a MH-MR expander and printed. The modem takes 4 bits at a time, for example, when operating at 9600 b/s, and represents them as one of 16 different states. CCITT recommendation V.29, V.27 ter specifies the modulation and demodulation schemes and the necessary portions of the CCITT modem built into the Group 3 facsimile unit. Recommendation V.27 ter is required for facsimile data at 4800 and 2400 b/s. Recommendation V.21 channel 2 (return channel) is required for the 300 b/s signaling. Recommendation V.29 is optional for facsimile data at 9600 and 7200 b/s for use on point-to-point four-wire leased type telephone channels and high-quality switched telephone channels. The Group 3 will usually try at first for 9600 b/s and if that is not successful will step down to 7200 b/s and attempt that. If necessary, this process can be repeated for the 4800 and 2400 b/s. When in the V.29 operating state at 9600 b/s the sampling of the incoming data facsimile signal is in 4-bit segments. As stated previously, there are 16 different analog signal states at the modem output which represents every possible arrangement of the 0s or 1s of the 4-bit segments at its input. FIG. 2 illustrates a V.29 signal space diagram at 9600 b/s. There are 16 different analog signal states at the modem output which represents every possible arrangement of the 0s or 1s of the four bit segments at its input. In the diagram Q represents the vertical coordinate and I represents the horizontal coordinate. Note that the phase is counter clock wise going from 0 to 360 about this coordinate axis and the amplitude is represented by the distance from the center of the diagram. From 0 to 90 degrees represents the first quadrant, 90 to 180 degrees represents the second quadrant, 180 to 270 degrees represents the third quadrant and 270 to 360 or 0 degrees represents the fourth quadrant. Each of the 16 dots represents a different signal state of the amplitude and phase. At 90 degrees, for example, the signal state 1010 has an amplitude of 3 and state 0010 has an amplitude of 2 as shown in FIG. 2. At 9600 b/s, the modem output changes 2,400 times per second for a baud rate of 2,400. The received PSTN analog signal from the network at the received modem compares the received signal dots to these standard dots in FIG. 2 and if the transmission is perfect these dots should coincide. Transmission impairments, such as phase jitter and noise can cause the received signals dots to move around form their assigned position and be taken to an adjacent signal state. This represents errors. A typical receiver an output of the modem is then converted to the expansion of MR/MR expansion to reproduce the binary midstream which represents the black and white pixels or pels from the CCD scanner for example. A terminal printer converts the bit stream into a printed copy of the original page. The thermal printer has closely space wires touching temperature responsive paper and heat is generated in a small spot on each wire when high current representing a black mark is passed to the wire.

In the middle of the 1980's, the growth of facsimile began to increase rapidly and the more the faxes became present the more the demand for storing the facsimile information became evident. The storage devices are sort of a facsimile mail boxes which receive data while party is away or receiving other facsimile requests and retrieved or discarded when the party returns or otherwise able to receive the facsimile. The party can receive multiple messages at the same time. The facsimile mail box systems do not actually print the expansion data and therefore have no need for the MH-MR expansion or to decode the scan lines and print the information.

It has also become desirable for the telephone central office to transmit the PSTN digitally using pulse code modulation where the amplitude of sampled voltage levels of the analog signal are represented by eight bit binary data.

It is desirable to determine the quality of the received signal at these facsimile mail boxes and to communicate when there is bad quality to the sender so that the rate may be slowed down or sent at another time or some other means may be done to improve the transmission quality. The transmission quality is normally determined as the percentage of bad scan lines. As discussed in the background facsimile machines use an encoding scheme (CCITT T.4) that sends a fixed number of picture elements per scan line. The copy quality of a Fax document is usually measured in the prior art as the percentage of bad scan lines. A line is considered bad if the decoded run-lengths in the scan line do not add up to 1728 picture elements or pixels. This implies that the scan lines must be at least partially decoded. This decoding in terms of decoding time and/or in terms of memory usage is expensive in terms of CPU (Central Processor Unit) resources. It takes a lot of memory space to store the decoding tables and cycle time to do the decoding.

SUMMARY OF THE INVENTION

In accordance with one embodiment of the present invention a method and an apparatus is provided to determine the copy quality of a facsimile page without MR/MH expansion or decoding the scan lines by the use of the received I and Q modem signal. While the prior art uses the percentage of bad scan lines applicant measures the distance between the I,Q position and the closest constellation point and determines the percentage of points that exceed a given threshold distance to determine quality.

In accordance with still other embodiments of the present system an improved facsimile mail box or storage system for storing facsimiles is provided by a storage device and a media processor for converting PCM (Pulse Code Modulation) digital PSTN signals to run length encoded MH-MR data for storage to said storage device and for receiving said run length encoded binary data from said storage devices and transmitting this data as PCM data on said telephone lines. The media processor includes a digital modem for converting received facsimile data in the PCM format to run length encoded data for storage and means for determining signal quality including a partial decoder for decoding end of line and means for determining the received I and Q signal quality of the received modem signal.

These and other features of the invention that will be apparent to those skilled in the art from the following detailed description of the invention, taken together with the accompanying drawings.

DETAILED DESCRIPTION OF INVENTION

Figure 3:
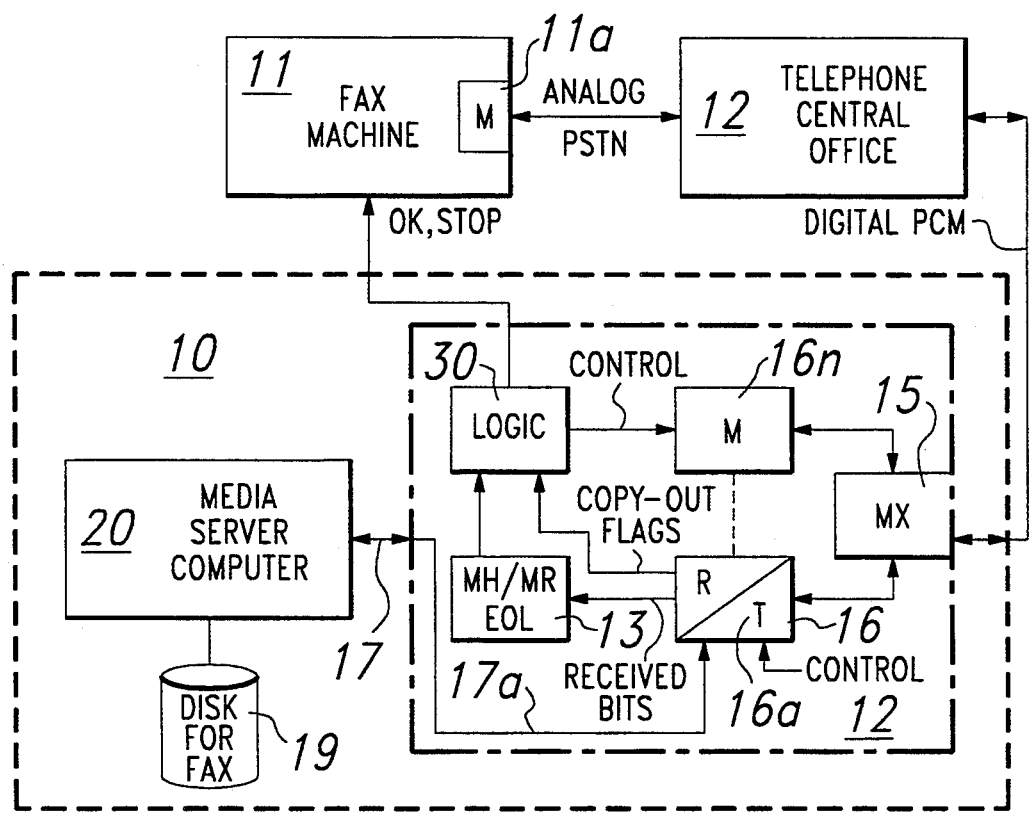
FIG. 3 is a block diagram of a facsimile mail box system as used in connection with the present invention.

Referring to FIG. 3, the signals from a typical facsimile machine 11 whether it be from a scanner and modem 11a or by a modem 11a and other source means in an analog PSTN format with, for example, amplitude and phase signal modulation (QAM) representing logic 1s and logic 0s are sent to, for example, a telephone central office 12. These signals are converted at the central office from analog to digital using an analog to digital converter to form a PCM (Pulse Code Modulation) or digital PSTN T1 signal. The PCM data has binary data representing sample voltage levels of the PSTN analog signal. The digital T1 PSTN signal is received at a facsimile mail box system 10 at media processor 14. The media processor 14 is a digital signal processor that includes one or more digital modems 16 for receiving these PCM digital PSTN T1 data signals via time multiplexer 15. These PCM signals are converted in the digital modem 16 to run-length encoded binary data with MH-MR compression and then stored in a disk file system 19, for example, using the media server computer 20. In the case where there are multiple modems 16, this is done on a time multiplex basis under control of an operating system OS.

The stored digital run length compressed data when transmitted is coupled to the digital modems 16 at the transmit portion T over bidirectional bus. 17 and internal data line 17a.

Each digital modem 16 receives the run length encoded stored bits from storage 19 and PCM modulates them on the appropriate carrier and transmits them over the transmit portion T of modem 16 as shown in FIG. 3.

Figure 4:
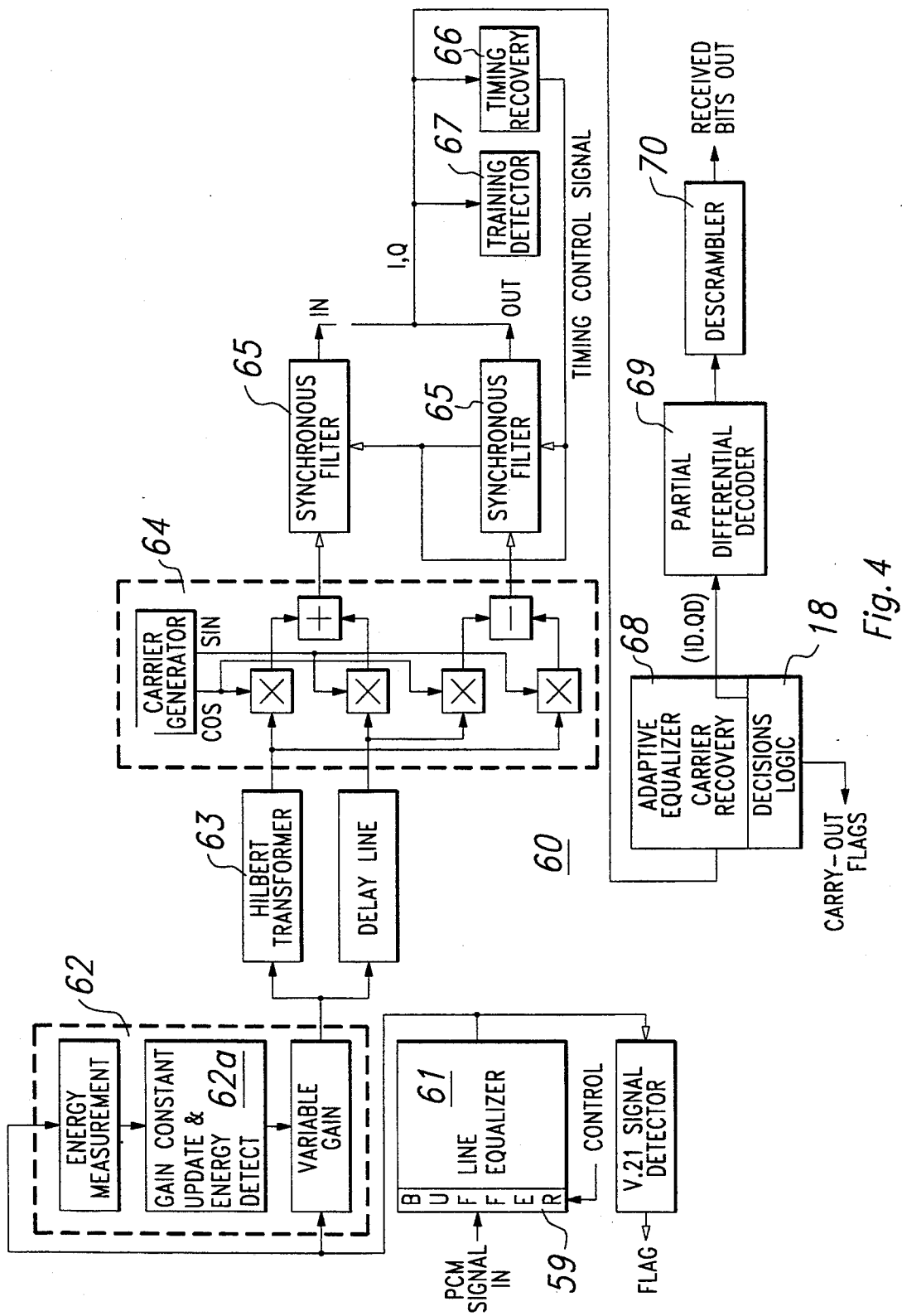
FIG. 4 is a block diagram of the receiver half of the modem of the media processor in FIG. 3.

Turning back to the receiver portion R of the modem receiver 60 as shown in FIG. 4 includes a PCM buffer 59, line equalizer 61, an automatic gain control 62, a Hilbert transformer 63, a demodulator 64, a synchronous filter 65, a clock recovery 66, a decision logic 68 and a partial decoder 69. The modem accepts PCM samples at 8 Khz and the line equalizer 61 corrects for line amplitude and phase distortion. The PCM buffer stores 256 samples of the PCM data. The automatic gain control 62 includes variable gain block that is a digitally programmable amplifier to amplify weak signals and attenuate strong signals. The gain control is adjusted by detecting the energy level of the received signal and providing the proper gain control via gain control 62a. This is to compensate for amplitude variations on the telephone line. The Hilbert transformer 63 is a band limiting filter to shape the incoming received signal to filter extraneous frequencies such as noise and also the transmit signal spectrum. Further, the filter provides the introduction of the 90 degree phase shift for the I and the Q channel separation so there are no harmonics at the output of the demodulator. The delay line illustrated is to compensate for the delay introduced by the Hilbert transformer 63. The demodulator extracts the baseband (intelligence) from the composite modulated signal. The demodulator 64 includes the carrier generator to generate the carrier frequency specified by the CCITT recommendations. The generator 64a uses sin and cos look-up tables to generate the tone. The demodulator 64 is a complex mixer with four multiplexers and two summers and an inverter to recover the transmitted baseband I' and Q' signals. The demodulated output is applied through a synchronous filter which is a pulse shaping low pass filter that limits the signal according to CCITT specifications. It also adjusts the sampling rates from 8K to 9.6K bits per second (BPS). The 8K rate is the sampling rate for the PCM data in the telephone digital and the 9.6K rate is a multiple of the baud rate. The filter roll-off is specified by CCITT.

Figure 5:
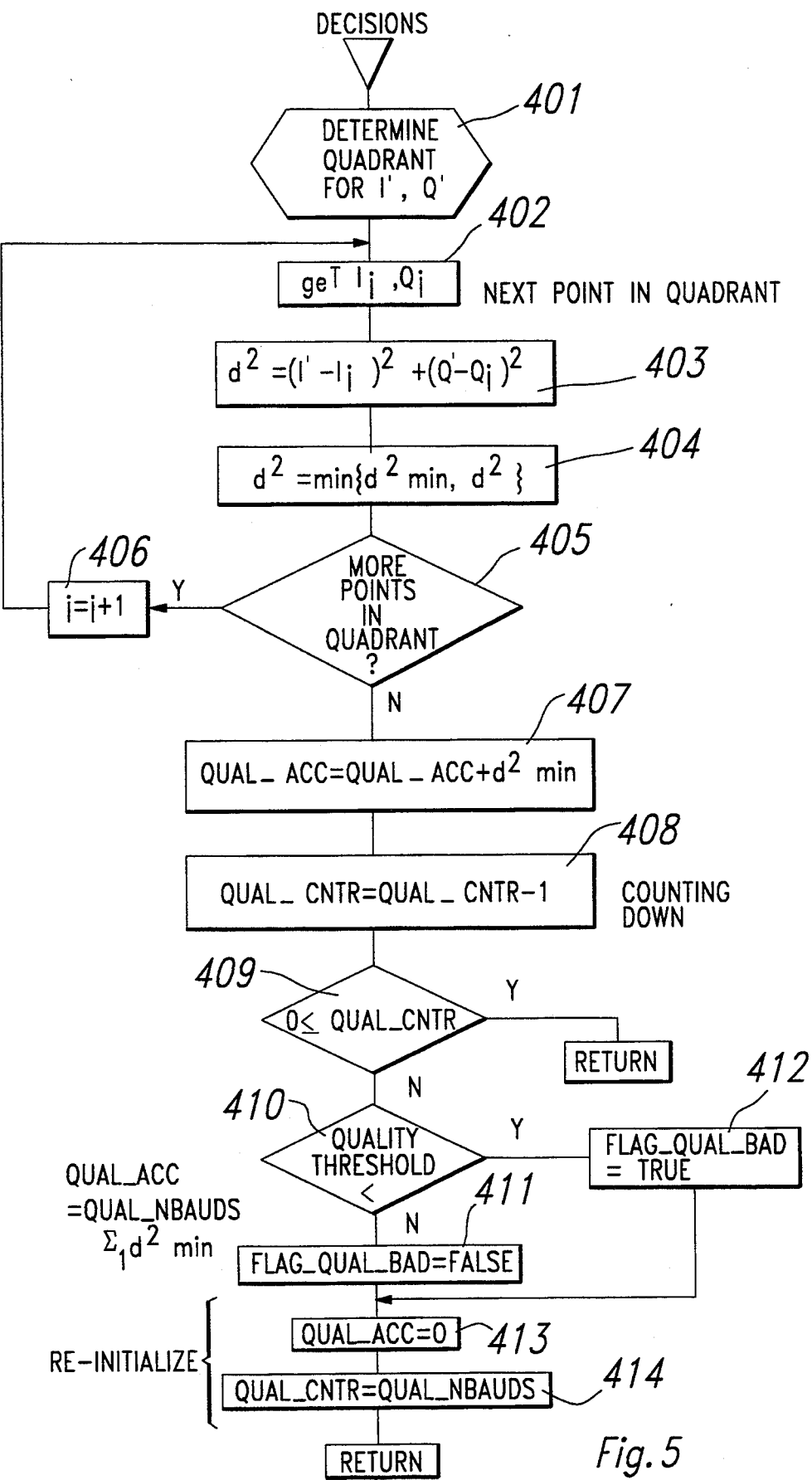
FIG. 5 is a flow diagram illustrating the operation of the decision and copy quality logic 18 in the modem of the media processor in FIG. 4, according to one embodiment of the present invention.

Before the transmission of a fax page, the transmitter sends an equalization training signal to help the receiver lock onto the characteristics of the telephone line. The training detector 67 detects the beginning of the training sequence and then starts the adaptation of the equalizer. The training detector 67 detects by measuring the bit clock recovery errors. The timing recovery 66 analyses the signal, determines if the signal was sampled at the correct time and then feeds the "timing control signal" back to the front end filters. The timing recovery uses a phase and frequency difference method to measure the timing error. The error is fed back to the interpolating/decimating filters to achieve proper sample selection. The adapter equalizer in block 68 is used to track and simulate the inverse frequency characteristic of the telephone line. The carrier recovery part of block 68 is used to adjust for the difference in the transmitter and receiver carrier frequency and phase. The carrier recovery in block 68 measures the phase difference between the received point and the ideal point, integrates the phase difference, and then uses the phase difference to control a voltage controlled oscillator. The voltage controlled oscillator is used to control, in turn, the rotation of future received points. The decision logic 18 of block 68 converts the received signal back into logic levels. A descrambler 70 is used if the signal was scrambled. Referring to FIG. 5, a more detailed description of the decision and copy quality logic 18 is provided in connection with FIG. 5. The decision and copy quality logic 18 compares the incoming I',Q' signal element with the standard and determines if the actual is within the range of acceptable phase and amplitude points on the constellation and, if so, a decision is made that it is a given closest point and that set of bits is selected. If between constellation points, one is selected and a possible error exists. In a conventional facsimile receiver, the data is MH-MR expanded and printed and errors are then detected. For more on modems, see pages 221-278 of "Digital Signal Processing Applications With the TMS320 Family", Vol. 2, published by Texas Instruments Incorporated of Dallas, Tex. This text is incorporated herein by reference.

Figure 1:
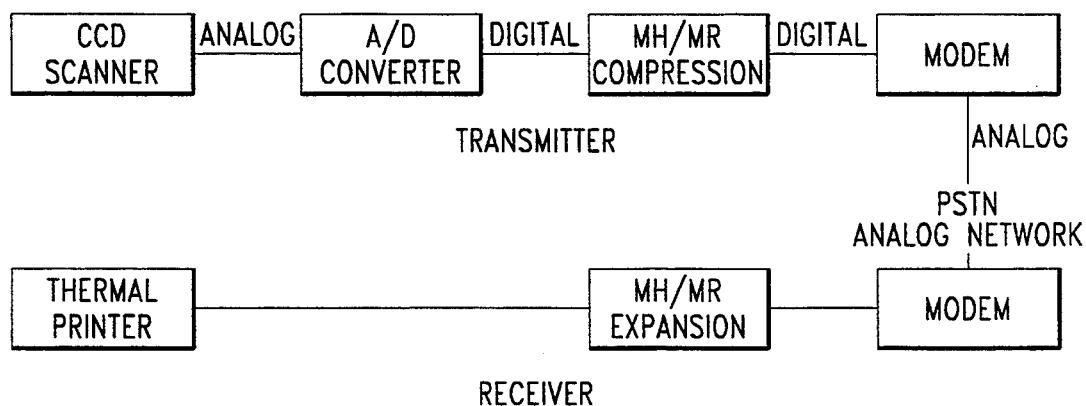
FIG. 1 is a block diagram of a Group 3 facsimile system according to the prior art.
Figure 2:
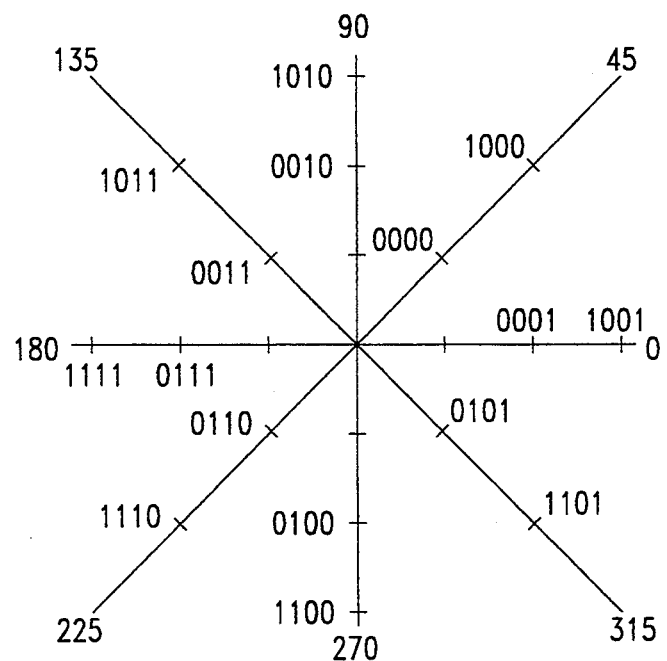
FIG. 2 is a V.29 signal space diagram at 9600 b/s in accordance with known prior art.
Figures 6, 7:
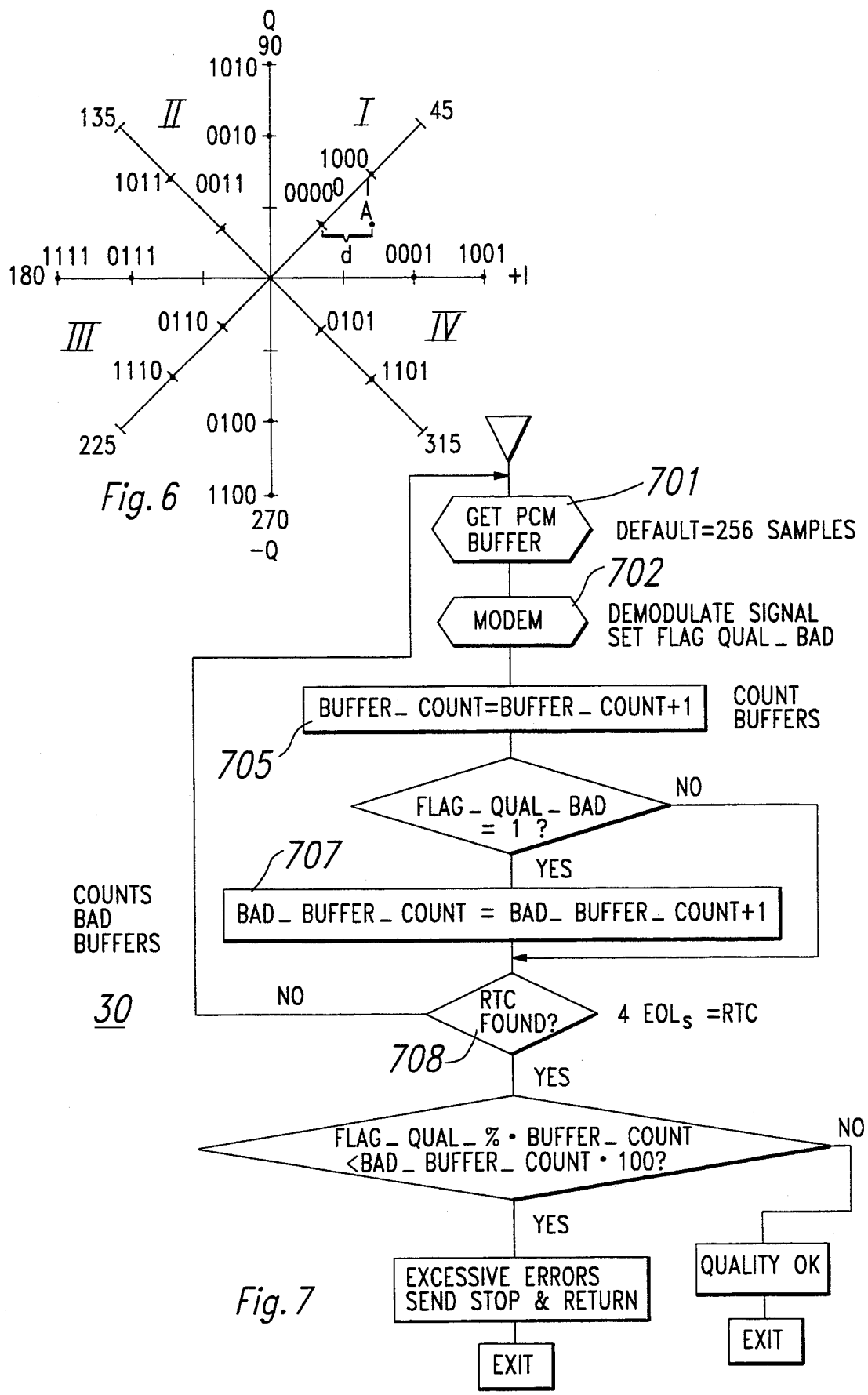
FIG. 6 is the V.29 space diagram of FIG. 2 with a received I,Q point plotted thereon for illustrating the operation of the present invention.
FIG. 7 is a flow diagram illustrating the operation of the logic 30 in FIG. 3 according to one embodiment of the present invention.

In accordance with the present invention, the modem 16 in the media processor 14 is like that described above. The modem processes one block at a time to recover four bits per decoded baud which is four bits where one bit represents the amplitude and the other three bits of the block represent the phase. From this the actually received I,Q points are determined. The media processor 14, for example, may include a means for determining the copy quality of the facsimile page without decoding the scan lines to determine signal quality, as done in conventional systems. As discussed previously, in connection with modem 16, the received signals at the digital modem 16 decision logic 18 contains the I',Q' signal. From that signal, the logic system according to the present invention uses the euclidean distances method to find the closest constellation point, and from that, a measure of quality based on the shortest trigonometric distance averaged over a number of bauds and compares the results over a good/bad threshold. The converted output signal from the decision logic 18 which picks the closest point, is passed through decoder 69 and descrambler 70. Further, the output from the modem 16 is partially decoded in EOL decoder 13 to decode the end of a scan line. It is shown in FIG. 2 the signal space diagram represents all 16 reference points as a result of the 1s or 0s of these 4-bit segments. Each of these 16 dots represents a different signal state of amplitude and phase. The actual received points represented by the I' and Q' signal points is detected at the digital modem 16 and sent to logic 18. In the system of the media processor 14, the logic 18 includes the microcode, illustrated by the flow diagram of FIG. 5. Referring to FIG. 5, the logic 18 in Step 401 first determines which of the quadrants labeled I, II, III or IV, the received signal I',Q' is in. Once that is determined, the next step is to check all the points on the quadrant that are I,Q legitimate points in those quadrants and to pick that point of the standard 16 which is the closest to the received point and determine the distance. This is done getting one of the standard points Ij,Qj as indicated in Step 402 and measuring that distance from the received point in steps and storing the closest point as indicated by Step 404. As indicated by decision logic Step 405 and incrementing logic Step 406, this measuring is done for all points in the quadrant. The decision logic 18 provides the closest constellation point as the output to decoder 69. For example, the received point in FIG. 6 is the received point and is closest to point 0000. In accordance with the preferred embodiment of the present invention the measurement for quality is by measuring the euclidean distance d between the detected constellation point (A in the example) and the nearest ideal point I and Q where the standard is located (point 0000 in the example) or $d^2=(I-I')^2+(Q-Q')^2$. The distance squared value is used as a metric because it is computationally expensive and unnecessary to perform the square root operation.

The copy-quality algorithm tests the accumulated distance squared over a number of samples that correspond to roughly 128 bits. The number of samples varies according to the number of bits per baud. The accumulation of the distances is in block 407 and the counting down of the number of accumulated sums is illustrated in blocks 408 and 409. Until the counter has counted down the designed number of samples the system continues to accumulate the distances. The next Step 410 is to determine if this accumulation of distance exceeds a threshold value which determines whether or not the signal is good or is a bad quality signal. This threshold value is less than half the distance between the two closest points. A separate counter in logic counts the number of good flag for those at threshold or better than threshold (from N output) and the number of bad signals or bad flag signals at counter 412 for those below the threshold level. The system is re-initialized through Steps 413 and 414. The copy quality is set such that at the end of a block of data (or 128 bytes) set of the output data in a flag of quality, the counter counts the number of bad blocks per page and then increments a counter at a threshold which is settable. A page boundary is determined by counting four end of lines in a row. The percentage of determination is made and with a 5-percent considered reasonable on a page boundary basis. A determination is made at the end of a line by a signal responsive to the eleven 0's plus a 1 which indicates the end of a line received at an EOL decoder 13 in FIG. 3. This end of line is in docked. From that the determination is made. This does not require a full MH/MR expansion but only to look for the ends of the line as transversed by that particular code which indicates end of a line, which is 11 logic 0s followed by a logic 1. The EOL decoder 13 counts four end of lines in a row and provides an end of page signal RTC to logic 30. The logic 30 is responsive to the FLAG-QUAL flags from the decision logic 18 and the RTC signal to determine excessive errors. FIG. 7 illustrates the logic in logic 30. The logic 30 sends control signals to the PCM buffer 59 in the modem 16 to read 256 samples as indicated in step 701. The scan line data is read out of the modem represented by step 702 and a counter 703 counts the number buffer samples. The FLAG-QUAL-BAD out of the decision logic 18 is given, for example, a logic "1" and a good quality is given a logic "0". If a logic "1" indicating a FLAG-QUAL-BAD the decision in step 706 provides a signal to increment the count bad buffer counter in step 707. When the end of four EOL in a row (Step 708) or RTC is found the quality is determined at step 709. In step 709, the threshold is the percentage of bad "data". If, for example, the percentage of bad data is five percent that decision would mean excessive errors and if less than five percent the quality would be good.

In accordance with one embodiment of the present invention the following method was used to determine the value of $d^2$. A noise signal was generated and added with the modem signal and the resulting error rate was measured and the value of $d^2$ was measured. The noise level was increased until the error rate was unacceptable, and was then backed off of a bit and the resulting value of $d^2$ was recorded and used as the maximum allowable distance.

The following table gives the $d^2$ values and the number of {I,Q} samples averaged.

|  | $d^2$ | # Constellation Points | Avg $d^2$ | d | # Bits/Baud |
| --- | --- | --- | --- | --- | --- |
| v.29 9600b/s | 8.0 | 32 | 0.25 | 0.5 | 4 |
| v.29 7200b/s | 10.7 | 43 | 0.259 | 0.498 | 3 |
| v.27 4800b/s | 1.0 | 43 | 0.023 | 0.151 | 3 |
| v.27 2400b/s | 5.6 | 64 | 0.0875 | 0.296 | 2 |

In accordance with the system if the resulting system shows poor quality beyond the threshold an RTN signal is sent to the transmitting scanner in Fax 11 to make a correction such as to send at a slower rate.

Although the present invention and its advantages have been described in detail, it should be understood that various changes, substitutions and alterations can be made herein without departing from the spirit and scope of the invention as defined by the appended claims.

What is claimed is:

1. A method of determining the quality of received facsimile data without full expansion and subsequent decoding of the scan lines comprising the steps of:
    sampling the received PCM digital signal at a telephone modem before full expansion and subsequent decoding;
    determining the I, Q position of the sample;
    determining the boundary of each scan line;
    measuring the distance between the received I, Q position and the closest constellation or standard point for each sample; and
    determining the accumulated distances over the number of samples per scan line to thereby determine the quality of the received facsimile data.

2. A method for determining facsimile copy quality comprising the steps of:
    sampling the received modem signal,
    determining the received I,Q sample point of said received signal;
    finding the quadrant of the received sample point;
    checking all constellation points of the quadrant;
    picking the closest constellation or standard point to the received sample point, determining the distance between the received sample point and the closest constellation standard point; and
    counting the received sample points that are beyond a given threshold distance.

3. The method of claim 2, further including the steps of determining the percentage of received sample points above said given threshold distance compared to the total sample points.

4. The method of claim 3, including the steps of determining the end of a page and counting the number of sample points over a page exceeding the threshold.

5. A system for determining the quality of a facsimile data signal without full expansion and subsequent decoding comprising:
    a modem responsive to the digital PCM signals on a telephone lines for sampling the received PCM signal and detecting the I,Q point of a received sample before full expansion;
    means for determining which quadrant on a constellation diagram the I,Q point of the received sample is in;
    means for checking all legitimate constellation points in that quadrant and means for determining the legitimate point that is closest to the I,Q point of the received sample;
    means for determining the end of each scan line;
    means for determining distance between the I,Q point of said received sample and the legitimate constellation point for each sample; and
    means for determining per scan line the number of sample distances that exceed a given threshold.

6. A system for determining the quality of a facsimile signal comprising:
    a modem responsive to the digital PCM signals on a telephone lines for sampling the received PCM signal and detecting the I,Q point of a received sample;
    means for determining which quadrant on a constellation diagram the I,Q point of the received sample is in;
    means for checking all legitimate constellation points in that quadrant and means for determining the legitimate point that is closest to the I,Q point of the received sample;
    means for determining if distance between the I,Q point of said received sample and the a legitimate constellation point exceeds a given threshold; and
    means for counting the number of received sample point distances that exceed the threshold and the number of received sample points within the threshold to determine if the percentage exceeds a given percent.

7. The apparatus of claim 6 further including means for determining the boundary of each scan line and then means for determining a bad scan line if the modem signal quality is poor for the raw data used to demodulate the scan line.

8. The apparatus of claim 6 wherein said given percent is five percent.

9. The apparatus of claim 5, including means for counting the number of received sample point distances that exceed the threshold and the number of received sample points within the threshold to determine if the percentage exceeds a given percent.

10. The apparatus of claim 9 wherein said given percent is five percent.

11. A facsimile mail box system for storing facsimile data which may later be called, comprising:
    a storage device for storing digital data signals representing facsimile information;
    a digital processor adapted to be coupled to a regular telephone line at one end and said storage means at the opposite end;
    said digital processor including one or more digital modems for converting PCM digital PSTN signals to run length encoded binary data for storage in said storage device; and
    said processor including means for determining signal quality without full expansion and subsequent decoding of the scan lines, said processor including means for sampling the PCM signal, means for determining the I,Q sample position, means for determining what quadrant of the sample position, means for picking the closest constellation point in the quadrant, means for determining the distance between the sample position and the closest constellation point, means for determining the end of a scan line and means for determining the accumulated distances over a number of samples per scan line.

12. A facsimile mail box system for storing facsimile data which may later be called, comprising:

a storage device for storing digital data signals representing facsimile information;

a digital processor adapted to be coupled to a regular telephone line at one end and said storage means at the opposite end;

said digital processor including one or more digital modems for converting PCM digital PSTN signals to run length encoded binary data for storage in said storage device;

said processor including means for determining signal quality without decoding the scan lines and said means for determining signal quality includes means for sampling the PCM digital signal, means for determining the I,Q sample position, means for determining what quadrant of the sample position, means for picking the closest constellation point in the quadrant, means for determining the distance between the sample position and the closest constellation point and means for counting the number of sample positions that exceeds a given threshold distance.

13. The system of claim 12 wherein the means for counting the number of points that exceed said threshold includes means for determining if the percentage of those exceeding said threshold distance exceeds five percent.

* * * * *